US010224976B2

(12) United States Patent
Chai et al.

(10) Patent No.: US 10,224,976 B2
(45) Date of Patent: Mar. 5, 2019

(54) DISPLAY PANEL WITH TRANSPARENT CONDUCTOR BASED ISOLATOR AND METHOD FOR IMPROVED WIRELESS COMMUNICATIONS

(71) Applicant: Intel Corporation, Santa Clara, CA (US)

(72) Inventors: Mei Chai, Marietta, GA (US); Helen Kankan Pan, Saratoga, CA (US); Bryce Horine, Portland, OR (US); Harry G. Skinner, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/119,358

(22) Filed: Aug. 31, 2018

(65) Prior Publication Data

US 2019/0020370 A1     Jan. 17, 2019

Related U.S. Application Data

(63) Continuation of application No. 15/730,333, filed on Oct. 11, 2017, which is a continuation of application
(Continued)

(51) Int. Cl.
*H04B 1/40* (2015.01)
*H01Q 21/28* (2006.01)
(Continued)

(52) U.S. Cl.
CPC .............. *H04B 1/40* (2013.01); *G06F 3/147* (2013.01); *H01Q 1/243* (2013.01); *H01Q 1/521* (2013.01); *H01Q 15/006* (2013.01); *H01Q 21/28* (2013.01)

(58) Field of Classification Search
CPC .................................. H04B 1/40; G06F 3/147
See application file for complete search history.

(56) References Cited

U.S. PATENT DOCUMENTS 6,507,150 B1   1/2003   Lin et al.
9,813,102 B2   11/2017  Chai et al.
(Continued)

FOREIGN PATENT DOCUMENTS

CN    2874802      2/2007
CN    201540964    8/2010
(Continued)

OTHER PUBLICATIONS

"European Application Serial No. 15194401.4, Extended European Search Report dated May 23, 2016", 10 pgs.
(Continued)

*Primary Examiner* — Errol Fernandes
(74) *Attorney, Agent, or Firm* — Schwegman Lundberg & Woessner, P.A.

(57) ABSTRACT

An apparatus of a mobile communication device comprises at least one radio with signal processing circuitry arranged to transmit and receive radio frequency (RF) signals. The apparatus includes a plurality of display components. An antenna layer is coupled to the signal processing circuitry and is configured for transmission and reception of the RF signals. The antenna layer is disposed between one of the plurality of display panel components and at least one isolation layer. The plurality of display panel components includes at least one of a protection coating layer, a display panel, a touch panel, or a cover.

26 Claims, 5 Drawing Sheets

Related U.S. Application Data

No. 14/570,903, filed on Dec. 15, 2014, now Pat. No. 9,813,102.

(51) Int. Cl.
    *H01Q 15/00*      (2006.01)
    *H01Q 1/52*      (2006.01)
    *H01Q 1/24*      (2006.01)
    *G06F 3/147*      (2006.01)

(56) References Cited

U.S. PATENT DOCUMENTS

| | | | |
|---|---|---|---|
| 2010/0177076 A1* | 7/2010 | Essinger | G09G 3/3433 |
| | | | 345/207 |
| 2014/0340279 A1 | 11/2014 | Bayram et al. | |
| 2016/0173161 A1 | 6/2016 | Chai et al. | |
| 2016/0344089 A1 | 11/2016 | Baik et al. | |
| 2018/0198480 A1 | 7/2018 | Chai et al. | |

FOREIGN PATENT DOCUMENTS

| | | |
|---|---|---|
| CN | 202695699 | 1/2013 |
| CN | 102956973 | 3/2013 |
| CN | 103514473 | 1/2014 |
| CN | 105703795 | 6/2016 |
| EP | 2991162 | 3/2016 |
| WO | 2014194575 | 12/2014 |

OTHER PUBLICATIONS

"U.S. Appl. No. 14/570,903, Restriction Requirement dated Oct. 7, 2016", 5 pgs.

"U.S. Appl. No. 14/570,903, Restriction Requirement dated Dec. 13, 2016", 5 pgs.

"U.S. Appl. No. 14/570,903, Response filed Feb. 13, 2017 to Restriction Requirement dated Dec. 13, 2016", 7 pgs.

"U.S. Appl. No. 14/570,903, Non Final Office Action dated Mar. 9, 2017", 7 pgs.

"U.S. Appl. No. 14/570,903, Response filed Jun. 9, 2017 to Non Final Office Action dated Mar. 9, 2017", 10 pgs.

"U.S. Appl. No. 14/570,903, Notice of Allowance dated Jun. 29, 2017", 7 pgs.

"U.S. Appl. No. 14/570,903, PTO Response to Rule 312 Communication dated Aug. 21, 2017", 1 page.

"Chinese Application Serial No. 201510766289.2, Office Action dated Sep. 18, 2017", w English Translation, 20 pgs.

"Chinese Application Serial No. 201510766289.2, Response filed Feb. 5, 2018 to Office Action dated Sep. 18, 2017", w claims in English, 16 pgs.

"Chinese Application Serial No. 201510766289.2, Office Action dated Mar. 26, 2018", w English summary, 4 pgs.

"U.S. Appl. No. 15/730,333, Notice of Allowance dated Jun. 27, 2018", 8 pgs.

"Chinese Application Serial No. 201510766289.2, Response filed Jun. 5, 2018 to Office Action dated Mar. 26, 2018", w English claims, 12 pgs.

Ucar M, H B, "Switchable Split-Ring Frequency Selective Surfaces", Progress in Electromagnetics Research B, Electromagnetics Academy, Us.vo l. 6, (Jan. 1, 2008), 65-79.

* cited by examiner

DISPLAY PANEL WITH TRANSPARENT CONDUCTOR BASED ISOLATOR AND METHOD FOR IMPROVED WIRELESS COMMUNICATIONS

CROSS-REFERENCE TO RELATED APPLICATION

This application is a continuation of U.S. patent application Ser. No. 15/730,333, filed Oct. 11, 2017, which is a continuation of U.S. patent application Ser. No. 14/570,903, filed Dec. 15, 2014, now issued as U.S. Pat. No. 9,813,102, both of which are incorporated by reference herein in their entirety.

TECHNICAL FIELD

Some embodiments relate to wireless communications. Some embodiments relate to Wi-Fi networks and networks operating in accordance with one of the IEEE 802.11 standards. Some embodiments relate to uplink multi-user MIMO (UL MU-MIMO) communications. Some embodiments relate to display panels. Embodiments described herein relate generally to improved antenna isolation using thin films of transparent conducting oxides on the display of a communication platform.

BACKGROUND

The conventional approach for platform antenna isolation is to place the antenna component at essentially the farthest distance from the other components of the platform in order to obtain minimum undesired antenna coupling. This is limited by a compact platform with limited space. Currently there is a need for antenna isolation in multi-radio platforms, particularly those that employ multiple input-multiple outputs (MIMO).

DESCRIPTION OF EMBODIMENTS

The conventional approach for platform antenna isolation is to place the antenna component(s) at essentially the farthest distance from the other components of the platform to obtain maximum isolation for an antenna, and minimum coupling between and among a plurality of antennas. This is limited by a compact platform with limited space. Orthogonal antenna polarization is also implemented in mobile platforms to increase isolation. But such antenna polarization is limited to 3 in 3-dimensional space. In a realistic mobile platform implementation, the realistic antenna orthogonally is 2. As MIMO increases to greater than 2, invisible transparent conductor isolation addresses these challenges to further improve isolation without number limitation.

Antenna isolation can be enhanced by using an essentially invisible transparent conductor design in the large display panel of a communication platform, or device, to improve the isolation for the entire system. Transparent conductors may include transparent conducting oxides (TCO) such as indium tin oxide (ITO), and other compounds, that have marginal impact on the visibility of a display.

In the past, wireless components were not placed on the display of a device such as, in an embodiment, a mobile phone. The disclosed innovation places large areas of transparent material on the display. Most of the transparent material comprises transparent conductors that are based on, in one embodiment, ITO. Other similar compounds may be used. Antenna and system isolation is enhanced using transparent conductor based isolation for this large display panel to improve the isolations for the entire system. Further, this new isolator design is not limited to the display only, but can be applied to any other platform component which has visibility requirements, like the back of the communication platform chassis. This requirement may be for, in various embodiments, transparent communication devices, flexible devices, and the like, which may require transparent or see-through chassis components.

As mentioned above, the disclosed antenna integration with display panels improves the isolation for the entire system in which the display is a component and boosts MIMO antenna performance. Further, this transparent isolator design utilizes previously unusable display panel area and optimizes mobile platform performance. This allows more radios to be integrated in a mobile platform with minimum crosstalk than could be integrated into the mobile platform without the isolator, or the same number of radios integrated into a smaller mobile platform with the isolator. In other words, including the isolator in a mobile platform allows an increased density, or number, of radios in the mobile platform.

In one embodiment an indium tin oxide (ITO) based electromagnetic band gap (EBG) structure may be designed at 2.4 GHz and used as the isolator film. In other embodiments structures other than EBG may be used provided that transparent conductor based structures which comprise, in various embodiments, ITO, ITO ink, graphite, carbon nanotubes, conductive polymers, and other oxide materials are used.

Figure 1:
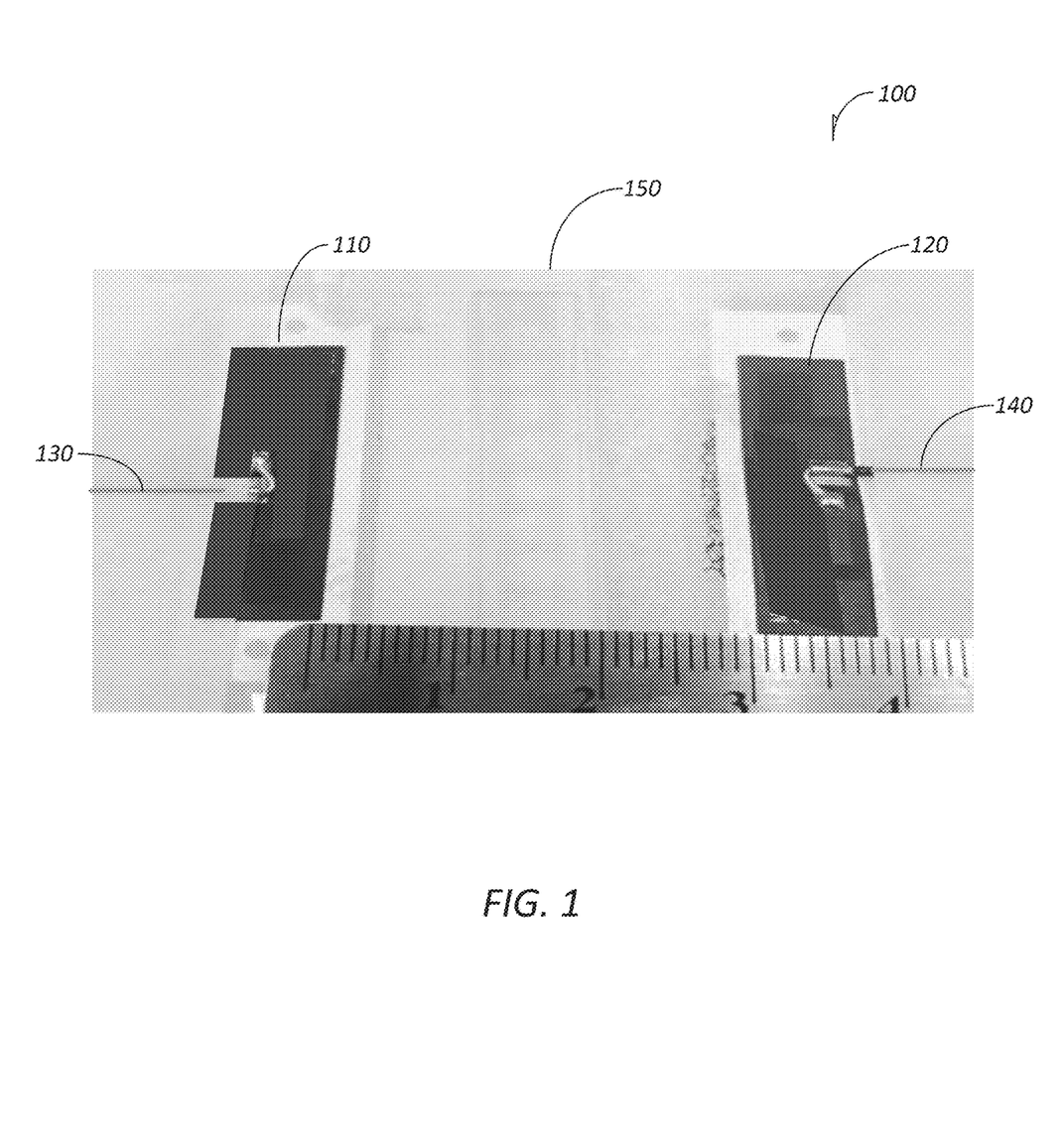
FIG. 1 illustrates an isolation testing setup for an isolation study useful for an embodiment.

FIG. 1 illustrates an isolation testing setup for an isolation study. In one embodiment an ITO based EBG structure may be designed at 2.4 GHz. Various scenarios or designs for the platform antenna isolation improvement technique using a transparent EBG design have been tested, and isolation improvement has been measured, in the laboratory. As seen in FIG. 1 a testing setup 100 tests the S12 of two antennas. S-parameters describe the input-output relationship between ports (or terminals) in an electrical system. If there are two ports, Port 1 and Port 2, then S12 represents the power transferred from Port 2 to Port 1. S21, on the other hand represents the power transferred from Port 1 to Port 2. Therefore, the testing currently described measures the undesired power transferred from one antenna to the other antenna.

Continuing with FIG. 1, test setup 100 comprises two antennas, 110 and 120. The antennas are placed on a glass surface 150 that includes a TCO film, in this case ITO using an EBG structure. Wires 130 and 140 are connected respectively to antennas 110 and 120 for an isolation study that measures the isolation between the two antennas. Invisible touch techniques that use beams of light to turn a flat space into a touch screen may be used in this testing. The isolator may be coexistent with the touch sensor component(s). The isolation improvement between two WiFi antennas has be measured for various test cases such as one and three EBG ITO based isolators, and three transparent conductors, such as transparent conductors on polyethylene terephthalate (PET) from Asahi Glass Co., Ltd. (AGC). Gains of approximately 6 dB to 10 dB for different testing setups have been measured.

Figure 2:
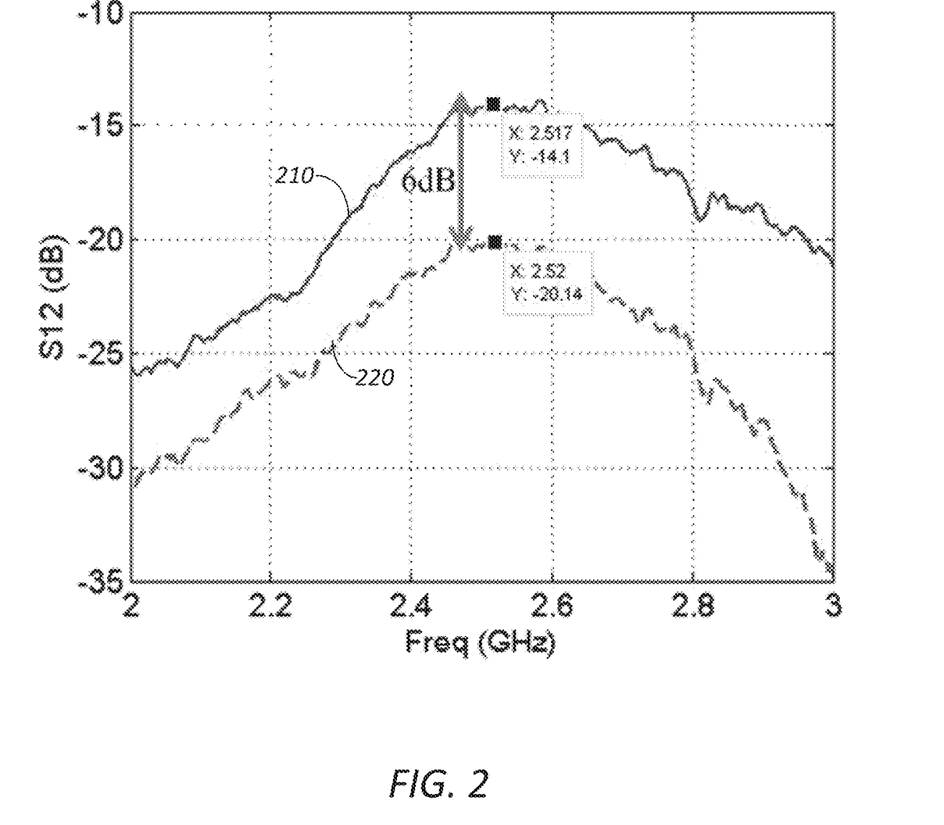
FIG. 2 illustrates the measured S12 of two antennas at WiFi™ frequencies using an embodiment.

FIG. 2 illustrates the measured S12 of the two antennas 110, 120 of FIG. 1 at WiFi frequencies for two cases. Curve 210 represents S12 without isolation on the display 150 of FIG. 1. Curve 220 represents S12 with an ITO film comprising an EBG structure on the display 150. The measured isolation advantage using ITO isolation is 6 dB as can be seen by the indicated vertical distance between the two curves at or near frequencies of 2.4 GHz to 2.6 GHz. The frequencies and the S12 value are noted at coordinates X and Y, respectively, in FIG. 2. Other experimental measurements using the same or a similar testing setup can be applied between any general antennas. Performance gains are not limited to the WiFi band only but other frequency bands suitable for wireless communication may be used.

Figure 3:
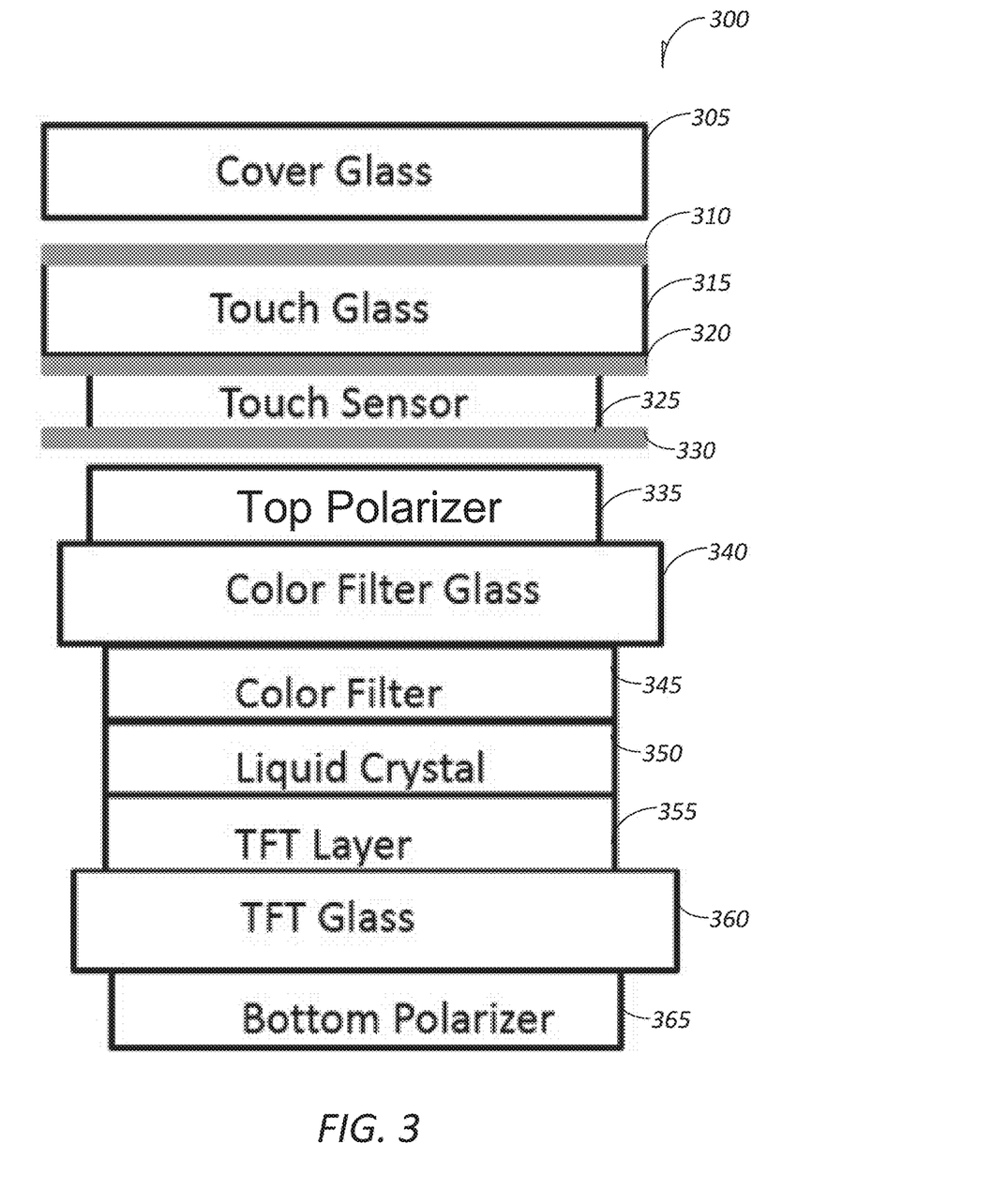
FIG. 3 illustrates a side view a stack of components that make up a display according to an embodiment.

FIG. 3 illustrates a side view a stack of components that make up a display according to an embodiment. The components, in exaggerated dimension, comprise a stack of components that make up a display such as, in one embodiment, a flexible flat panel display for a mobile phone. The stack 300 comprises cover glass 305, touch glass 315, touch sensor 325, top polarizer 335, color filter glass 345, liquid crystal 350, thin film transistor (TFT) layer 355, TFT glass 360 and bottom polarizer 365. This is only one of a number of embodiments of a display that may be used for isolation. A layer of isolator, such as ITO, may be placed at any of three places in the stack. In an embodiment the ITO layer 310 may be on the top of touch glass 315. In an embodiment a layer of isolator 320 may be part of the touch sensor 325. In an embodiment layer of isolator 330 may be at the bottom of touch sensor 325. And isolator designs with more than one layer of transparent conductor can be placed in these three layers 310, 320, and 330. Three more possible options are to place the TCO film above the color filter glass 340, below color filter glass 340, and around TFT layer 355. A 3D isolator may be placed between one or more of the layers as appropriate or necessary.

One or more embodiments can also be used to create isolation between multiple wireless subcomponents. Antennas may be the primary example for isolation, but there are other subcomponents that could be integrated into or be separate from the antenna, and these subcomponents may benefit from the isolation described herein. These could include a matching network as well as other wireless communication protocols such as, without limitation, BLUE TOOTH™ (BT), ultra-wideband (MB) and near field communication (NFC). One or more embodiment could be used as a layer to layer isolation or as a structure between layers (2D and 3D). The material can be indium tin oxide (ITO) but also any transparent conductor, including graphene and other transparent conductors. In addition, the term "transparent" can mean not perceived, invisible, or visible with an optical translucence of greater than eighty percent (80%), such that other materials or structures may be included within the term "transparent."

Figure 4:
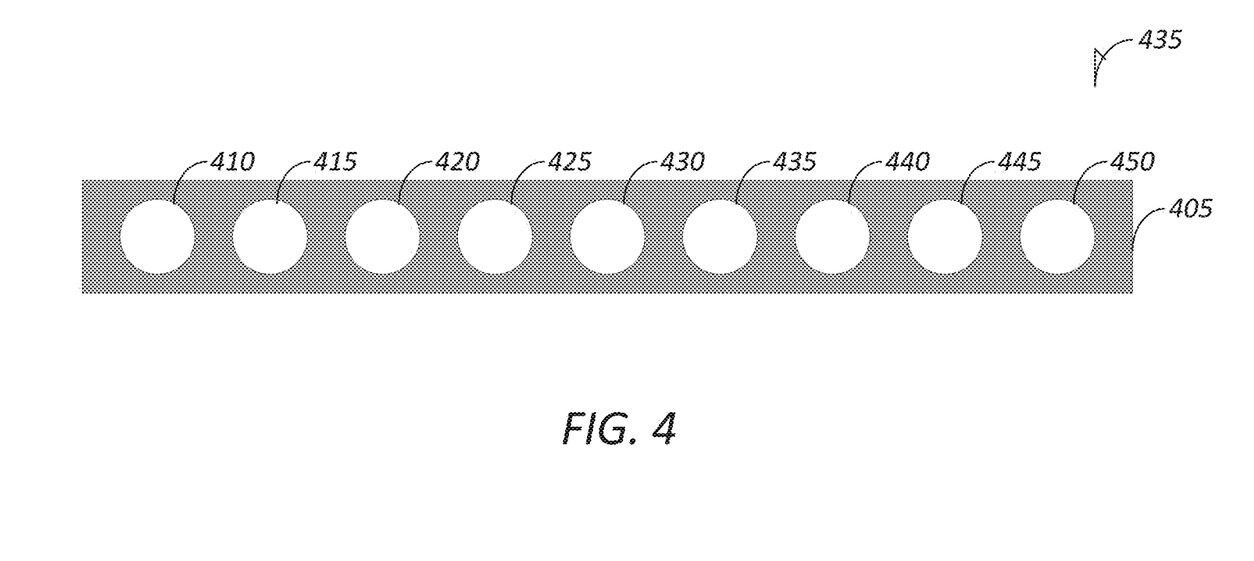
FIG. 4 illustrates an electromagnetic band gap (EBG) structure comprising a transparent conduction oxide according to an embodiment.

FIG. 4 illustrates an EBG structure comprising a transparent conducting oxide according to an embodiment. Such an EBG structure may be used as the ITO layer. The EBG structure 405 comprises ITO. Holes 410, 415, . . . , 450 may comprise merely air, such that the component below it in FIG. 3 may be seen. In one embodiment, the radius of the holes is substantially 2 mm, and the distance between centers of adjacent holes is substantially 5 mm.

Figure 5:
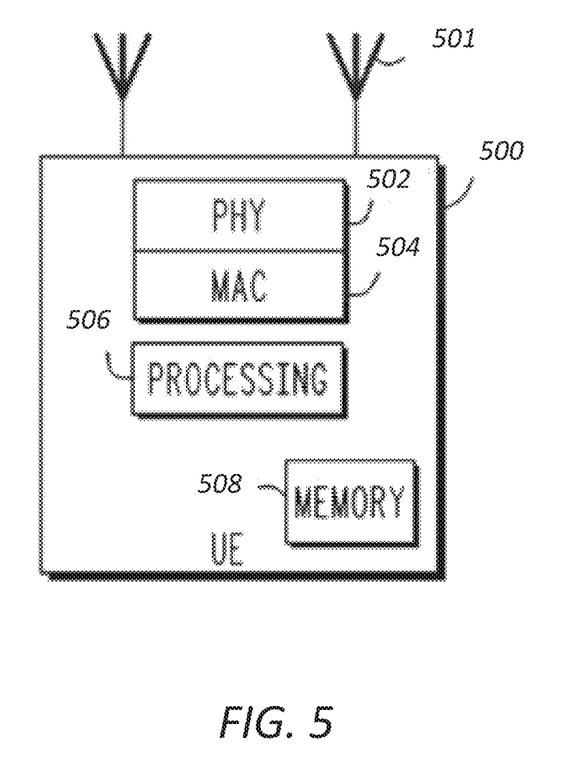
FIG. 5 illustrates a functional block diagram of user equipment (UE) in accordance with some embodiments.

FIG. 5 illustrates a functional block diagram of a communication platform with which the antenna isolation described herein may be used, in accordance with some embodiments. In some embodiments the communication platform may be UE configured to operation in a mobile communication network, such as a 3GPP LTE network, while in other embodiments, the communication platform may be a communication station (STA) configured to operation in a Wi-Fi network. The embodiments are not limited to 3GPP LTE networks, or Wi-Fi networks. In accordance with some embodiments, the open systems interconnection media access control (MAC) circuitry 504 may be arranged to contend for a wireless medium configure frames or packets for communicating over the wireless medium and the physical layer (PHY) circuitry 502 may be arranged to transmit and receive signals. The PHY 502 may include circuitry for modulation/demodulation, upconversion/downconversion, filtering, amplification, etc. In some embodiments, the processing circuitry 506 of the HE 500 may include one or more processors. In some embodiments, two or more antennas may be coupled to the physical layer circuitry arranged for sending and receiving signals. The memory 508 may be store information for configuring the processing circuitry 506 to perform operations for configuring and transmitting UE frames and performing the various operations described herein.

In some embodiments, the communication platform 500 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the platform 500 may include one or more of a keyboard, a display, a non-volatile memory port, multiple antennas, a graphics processor, an application processor, speakers, and other mobile device elements. The display may be a liquid crystal display (LCD) screen including a touch screen.

The one or more antennas 501 utilized by the communication platform 500 may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some MIMO embodiments, the antennas may be effectively separated to take advantage of spatial diversity and the different channel characteristics that may result between each of antennas and the antennas of a transmitting station. In some MIMO embodiments, the antennas may be separated by up to $\frac{1}{10}$ of a wavelength or more.

Embodiments may be implemented in one or a combination of hardware, firmware and software. Embodiments may also be implemented as instructions stored on a computer-readable storage medium, which may be read and executed by at least one processor to perform the operations described herein. A computer-readable storage medium may include any non-transitory mechanism for storing information in a form readable by a machine (e.g., a computer). For example, a computer-readable storage medium may include read-only memory (ROM), random-access memory (RAM), magnetic disk storage media, optical storage media, flash-memory devices, and other storage devices and media. In these embodiments, one or more processors may be configured with the instructions to perform the operations described herein.

In some embodiments, the communication platform 500 may be configured to receive orthogonal frequency division multiplexing (OFDM) communication signals over a multicarrier communication channel in accordance with an orthogonal frequency division multiple access (OFDMA) communication technique. The OFDM signals may comprise a plurality of orthogonal subcarriers. In some broadband multicarrier embodiments, Evolved Node Bs (eNBs) may be s may be part of a broadband wireless access (BWA) network communication network, such as a Worldwide Interoperability for Microwave Access (WiMAX) communication network or a 3rd Generation Partnership Project (3GPP) Universal Terrestrial Radio Access Network (UTRAN) Long-Term-Evolution (LTE) or a Long-Term-Evolution (LTE) communication network, although the scope of the invention is not limited in this respect. In these broadband multicarrier embodiments, the platform 500 and the eNBs may be configured to communicate in accordance with an OFDMA technique.

Although the communication platform 500 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs), radio-frequency integrated circuits (RFICs) and combinations of various hardware and logic circuitry for performing at least the functions described herein. In some embodiments, the functional elements may refer to one or more processes operating on one or more processing elements.

Examples and Additional Notes

Example 1 is an apparatus of a mobile communication device comprising: at least one radio comprising signal processing circuitry arranged to transmit and receive radio frequency (RF) signals; a plurality of display panel components; and an antenna layer coupled to the signal processing circuitry, the antenna layer configured for transmission and reception of the RF signals, the antenna layer disposed between one of the plurality of display panel components and at least one isolation layer, wherein the plurality of display panel components includes at least one of a protection coating layer, a display panel, a touch panel, or a cover.

In Example 2, the subject matter of Example 1 optionally includes wherein the antenna layer is disposed between the touch panel and a first isolation layer of the at least one isolation layer In Example 3, the apparatus of any one or more of Examples 1-2 optionally include wherein one of the plurality of display panel components comprises a transparent window cover.

In Example 4, the subject matter of any one or more of Examples 1-3 optionally include wherein one of the plurality of display panel components comprises a cover glass.

In Example 5, the subject matter of any one or more of Examples 1-4 optionally include wherein one of the plurality of display panel components comprises a touch sensor component.

In Example 6, the subject matter of any one or more of Examples 1-5 optionally include wherein one of the plurality of display panel components comprises a conductive ink.

In Example 7, the subject matter of any one or more of Examples 1-6 optionally include wherein one of the plurality of display panel components comprises a polarizer.

In Example 8, the subject matter of any one or more of Examples 1-7 optionally include wherein the at least one isolation layer comprises a transparent film.

In Example 9, the subject matter of any one or more of Examples 1-8 optionally include wherein the cover is one of plastic, tempered glass, thin-film glass or a resin film.

In Example 10, the subject matter of any one or more of Examples 1-9 optionally include wherein the antenna layer is disposed between the display panel and a second isolation layer of the at least one isolation layer.

In Example 11, the subject matter of any one or more of Examples 1-10 optionally include wherein the antenna layer is disposed between the cover and a first isolation layer of the at least one isolation layer.

Example 12 is an apparatus of a mobile device made by a process comprising: producing at least one radio, the at least one radio comprising signal processing circuitry arranged to transmit and receive radio frequency (RF) signals; producing an antenna layer and coupling the antenna layer to the signal processing circuitry, the antenna layer configured for transmission and reception of the RF signals; producing a plurality of display panel components; and disposing the antenna layer between one of the plurality of display panel components and at least one isolation layer, wherein the plurality of display panel components includes at least one of a protection coating layer, a display panel, a touch panel, or a cover.

In Example 13, the subject matter of Example 12 optionally includes wherein disposing the antenna layer between one of the plurality of display panel components and the at least one isolation layer comprises disposing the antenna layer between the touch panel and a first isolation layer of the at least one isolation layer.

In Example 14, the subject matter of any one or more of Examples 12-13 optionally include wherein one of the plurality of display panel components comprises a transparent window cover.

In Example 15, the subject matter of any one or more of Examples 12-14 optionally include wherein one of the plurality of display panel components comprises a cover glass.

In Example 16, the subject matter of any one or more of Examples 12-15 optionally include wherein one of the plurality of display panel components comprises a touch sensor component.

In Example 17, the subject matter of any one or more of Examples 12-16 optionally include wherein one of the plurality of display panel components comprises a conductive ink.

In Example 18, the subject matter of any one or more of Examples 12-17 optionally include wherein one of the plurality of display panel components comprises a polarizer.

In Example 19, the subject matter of any one or more of Examples 12-18 optionally include wherein the at least one isolation layer comprises a transparent film.

In Example 20, the subject matter of any one or more of Examples 12-19 optionally include wherein the cover is one of plastic, tempered glass, thin-film glass or a resin film.

In Example 21, the subject matter of any one or more of Examples 12-20 optionally include wherein disposing the antenna layer between one of the plurality of display panel components and the at least one isolation layer comprises disposing the antenna layer between the display panel and a second isolation layer of the at least one isolation layer.

In Example 22, the subject matter of any one or more of Examples 12-21 optionally include wherein disposing the antenna layer between one of the plurality of display panel components and the at least one isolation layer comprises disposing the antenna layer between the cover and a first isolation layer of the at least one isolation layer.

Example 23 is an apparatus of a mobile communication device comprising: at least one radio comprising signal processing circuitry arranged to transmit and receive radio frequency (RF) signals; a plurality of display panel components; at least one isolation means; and antenna means coupled to the signal processing circuitry, the antenna means configured for transmission and reception of the RF signals, the antenna means disposed between one of the plurality of display panel components and the at least one isolation means, wherein the plurality of display panel components includes at least one of a protection coating layer, a display panel, a touch panel, or a cover.

In Example 24, the subject matter of Example 23 optionally includes wherein the antenna means is disposed between the touch panel and a first isolation means of the at least one isolation means.

In Example 25, the subject matter of any one or more of Examples 23-24 optionally include wherein the antenna means is disposed between the display panel and a second isolation means of the at least one isolation means.

In Example 26, the subject matter of any one or more of Examples 23-25 optionally include wherein the antenna means is disposed between the cover and a first isolation means of the at least one isolation means.

Example 27 can comprise, or can optionally be combined with any portion or combination of any portions of any one or more of Examples 1 through 26 to include subject matter that can comprise means for performing any one or more of the functions of Examples 1 through 26, or a machine-readable medium including instructions that, when performed by a machine, cause the machine to perform any one or more of the functions of Examples 1 through 26.

The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a mobile communication device comprising:
   at least one radio comprising signal processing circuitry arranged to transmit and receive radio frequency (RF) signals;
   a plurality of display panel components; and
   an antenna layer coupled to the signal processing circuitry, the antenna layer configured for transmission and reception of the RF signals, the antenna layer disposed between one of the plurality of display panel components and at least one isolation layer,
   wherein the plurality of display panel components includes at least one of a protection coating layer, a display panel, a touch panel, or a cover.

2. The apparatus of claim 1 wherein the antenna layer is disposed between the touch panel and a first isolation layer of the at least one isolation layer.

3. The apparatus of claim 1 wherein one of the plurality of display panel components comprises a transparent window cover.

4. The apparatus of claim 1 wherein one of the plurality of display panel components comprises a cover glass.

5. The apparatus of claim 1 wherein one of the plurality of display panel components comprises a touch sensor component.

6. The apparatus of claim 1 wherein one of the plurality of display panel components comprises a conductive ink.

7. The apparatus of claim 1 wherein one of the plurality of display panel components comprises a polarizer.

8. The apparatus of claim 1 wherein the at least one isolation layer comprises a transparent film.

9. The apparatus of claim 1 wherein the cover is one of plastic, tempered glass, thin-film glass or a resin film.

10. The apparatus of claim 1 wherein the antenna layer is disposed between the display panel and a second isolation layer of the at least one isolation layer.

11. The apparatus of claim 1 wherein the antenna layer is disposed between the cover and a first isolation layer of the at least one isolation layer.

12. An apparatus of a mobile device made by a process comprising:
    producing at least one radio, the at least one radio comprising signal processing circuitry arranged to transmit and receive radio frequency (RF) signals;
    producing an antenna layer and coupling the antenna layer to the signal processing circuitry, the antenna layer configured for transmission and reception of the RF signals;
    producing a plurality of display panel components; and
    disposing the antenna layer between one of the plurality of display panel components and at least one isolation layer,
        wherein the plurality of display panel components includes at least one of a protection coating layer, a display panel, a touch panel, or a cover.

13. The apparatus of claim 12 wherein disposing the antenna layer between one of the plurality of display panel components and the at least one isolation layer comprises disposing the antenna layer between the touch panel and a first isolation layer of the at least one isolation layer.

14. The apparatus of claim 12 wherein one of the plurality of display panel components comprises a transparent window cover.

15. The apparatus of claim 12 wherein one of the plurality of display panel components comprises a cover glass.

16. The apparatus of claim 12 wherein one of the plurality of display panel components comprises a touch sensor component.

17. The apparatus of claim 12 wherein one of the plurality of display panel components comprises a conductive ink.

18. The apparatus of claim 12 wherein one of the plurality of display panel components comprises a polarizer.

19. The apparatus of claim 12 wherein the at least one isolation layer comprises a transparent film.

20. The apparatus of claim 12 wherein the cover is one of plastic, tempered glass, thin-film glass or a resin film.

21. The apparatus of claim 12 wherein disposing the antenna layer between one of the plurality of display panel components and the at least one isolation layer comprises disposing the antenna layer between the display panel and a second isolation layer of the at least one isolation layer.

22. The apparatus of claim 12 wherein disposing the antenna layer between one of the plurality of display panel components and the at least one isolation layer comprises disposing the antenna layer between the cover and a first isolation layer of the at least one isolation layer.

23. An apparatus of a mobile communication device comprising:
    at least one radio comprising signal processing circuitry arranged to transmit and receive radio frequency (RF) signals;
    a plurality of display panel components;
    at least one isolation means; and
    antenna means coupled to the signal processing circuitry, the antenna means configured for transmission and reception of the RF signals, the antenna means disposed between one of the plurality of display panel components and the at least one isolation means,
    wherein the plurality of display panel components includes at least one of a protection coating layer, a display panel, a touch panel, or a cover.

24. The apparatus of claim 23 wherein the antenna means is disposed between the touch panel and a first isolation means of the at least one isolation means.

25. The apparatus of claim 23 wherein the antenna means is disposed between the display panel and a second isolation means of the at least one isolation means.

26. The apparatus of claim 23 wherein the antenna means is disposed between the cover and a first isolation means of the at least one isolation means.

* * * * *